United States Patent
Chen et al.

(10) Patent No.: US 10,248,180 B2
(45) Date of Patent: *Apr. 2, 2019

(54) FAST SMP/ASMP MODE-SWITCHING HARDWARE APPARATUS FOR A LOW-COST LOW-POWER HIGH PERFORMANCE MULTIPLE PROCESSOR SYSTEM

(71) Applicant: Futurewei Technologies, Inc., Plano, TX (US)

(72) Inventors: Wei Chen, San Diego, CA (US); Tongzeng Yang, San Diego, CA (US); Konggang Wei, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/704,240

(22) Filed: May 5, 2015

(65) Prior Publication Data

US 2016/0109923 A1    Apr. 21, 2016

Related U.S. Application Data

(63) Continuation-in-part of application No. 14/580,044, filed on Dec. 22, 2014, which is a
(Continued)

(51) Int. Cl.
*G06F 1/32*        (2006.01)
*G06F 1/324*       (2019.01)
(Continued)

(52) U.S. Cl.
CPC ............ *G06F 1/324* (2013.01); *G06F 1/3275* (2013.01); *G06F 1/3296* (2013.01);
(Continued)

(58) Field of Classification Search
CPC ....... G06F 1/324; G06F 1/3275; G06F 1/3296
See application file for complete search history.

(56) References Cited

U.S. PATENT DOCUMENTS 5,475,324 A   12/1995  Tomiyori
5,774,704 A    6/1998  Williams et al.
(Continued)

FOREIGN PATENT DOCUMENTS

CN    101086722 A    12/2007
CN    102404211 A     4/2012
(Continued)

OTHER PUBLICATIONS

"International Application No. PCT/CN2015/091589, International Search Report dated Jan. 7, 2016", 6 pgs.
(Continued)

*Primary Examiner* — Mohammad Ali
*Assistant Examiner* — Vincent W Chang
(74) *Attorney, Agent, or Firm* — Schwegman Lundberg & Woessner, P.A.

(57) ABSTRACT

A processing system includes multiple processors in which a first processor operates at a first clock frequency and first supply voltage at all times. At least one processor is dynamically switchable to operate at the first clock frequency and first supply voltage resulting in the first and second processors providing symmetrical multi-processing (SMP) or at a second clock frequency and a second supply voltage resulting in the first and second processors providing asymmetrical multi-processing (ASMP). An integrated controller (e.g., finite state-machine (FSM)) controls not only voltage change, but also clock-switching. Various criteria can be used to determine when to switch the at least one switchable processor to improve power consumption and/or performance. Upon receipt of a switching command to switch
(Continued)

between SMP and ASMP, a series or sequence of actions are performed to control a voltage supply and CPU/memory clock to the switchable processor and cache memory.

26 Claims, 6 Drawing Sheets

Related U.S. Application Data continuation-in-part of application No. 14/516,314, filed on Oct. 16, 2014, now Pat. No. 9,952,650.

(51) Int. Cl.
*G06F 1/3234* (2019.01)
*G06F 1/3296* (2019.01)
*G06F 1/3287* (2019.01)
*G06F 1/3293* (2019.01)

(52) U.S. Cl.
CPC .......... *G06F 1/3287* (2013.01); *G06F 1/3293* (2013.01); *Y02D 10/126* (2018.01); *Y02D 10/14* (2018.01); *Y02D 10/171* (2018.01); *Y02D 10/172* (2018.01); *Y02D 50/20* (2018.01)

(56) References Cited

U.S. PATENT DOCUMENTS

| | | | |
|---|---|---|---|
| 5,964,881 A | 10/1999 | Thor | |
| 7,555,590 B2 | 6/2009 | Elliot et al. | |
| 7,668,675 B2 | 2/2010 | Takita et al. | |
| 7,814,252 B2 | 10/2010 | Hoshakii | |
| 8,283,902 B1* | 10/2012 | Kahn | H02M 3/156 323/224 |
| 8,862,926 B2 | 10/2014 | De Cesare et al. | |
| 9,952,650 B2 | 4/2018 | Chen et al. | |
| 2004/0030942 A1 | 2/2004 | Barr et al. | |
| 2005/0138444 A1* | 6/2005 | Gaskins | G06F 1/08 713/300 |
| 2006/0129585 A1 | 6/2006 | Ishiki et al. | |
| 2007/0049133 A1 | 3/2007 | Conroy et al. | |
| 2007/0136617 A1* | 6/2007 | Kanno | G06F 1/3203 713/320 |
| 2007/0139085 A1 | 6/2007 | Elliot et al. | |
| 2007/0156370 A1 | 7/2007 | White et al. | |
| 2007/0283128 A1 | 12/2007 | Hoshaku | |
| 2008/0046770 A1 | 2/2008 | Jong et al. | |
| 2008/0263376 A1 | 10/2008 | Magklis et al. | |
| 2008/0297202 A1 | 12/2008 | Takita et al. | |
| 2009/0063888 A1 | 3/2009 | Gold et al. | |
| 2009/0235108 A1 | 9/2009 | Gold et al. | |
| 2010/0005323 A1 | 1/2010 | Kuroda et al. | |
| 2010/0073068 A1 | 3/2010 | Cho et al. | |
| 2010/0250998 A1 | 9/2010 | Herdrich et al. | |
| 2010/0295530 A1 | 11/2010 | Kenaga et al. | |
| 2011/0173477 A1 | 7/2011 | Asaba | |
| 2011/0283124 A1 | 11/2011 | Branover et al. | |
| 2012/0005535 A1 | 1/2012 | Shigehara | |
| 2012/0060170 A1* | 3/2012 | Vajda | G06F 9/4893 718/104 |
| 2012/0079290 A1 | 3/2012 | Kumar et al. | |
| 2012/0131356 A1 | 5/2012 | Han | |
| 2012/0198207 A1* | 8/2012 | George | G06F 1/3206 712/36 |
| 2013/0043917 A1 | 2/2013 | de Cesare et al. | |
| 2013/0060555 A1 | 3/2013 | Thomson et al. | |
| 2013/0111143 A1 | 5/2013 | Kurihara et al. | |
| 2013/0138444 A1 | 5/2013 | George | |
| 2013/0185570 A1* | 7/2013 | Kumar | G06F 1/26 713/300 |
| 2013/0227321 A1 | 8/2013 | Branover et al. | |
| 2013/0246781 A1 | 9/2013 | Qi et al. | |
| 2014/0139197 A1 | 5/2014 | Price et al. | |
| 2014/0181556 A1 | 6/2014 | Eckert et al. | |
| 2014/0258760 A1 | 9/2014 | Wells et al. | |
| 2014/0359311 A1* | 12/2014 | Jahagirdar | G06F 1/26 713/300 |
| 2015/0124546 A1* | 5/2015 | Son | G11C 5/147 365/226 |
| 2015/0355700 A1 | 12/2015 | Pusukuri et al. | |
| 2016/0004292 A1* | 1/2016 | Sharda | G06F 1/3243 710/317 |
| 2016/0109921 A1 | 4/2016 | Chen et al. | |
| 2016/0109922 A1 | 4/2016 | Chen et al. | |

FOREIGN PATENT DOCUMENTS

| | | |
|---|---|---|
| CN | 102609075 A | 7/2012 |
| CN | 102637134 A | 8/2012 |
| CN | 103229122 A | 7/2013 |
| EP | 1736851 | 12/2006 |
| JP | 05-259848 A | 10/1993 |
| JP | 10-133766 A | 5/1998 |
| JP | 2004-078642 A | 3/2004 |
| JP | 2004-078940 A | 3/2004 |
| JP | 2007047966 | 2/2007 |
| JP | 2008-515065 A | 5/2008 |
| JP | 2008-299731 A | 12/2008 |
| JP | 2010-211544 A | 9/2010 |
| JP | 2010-218277 A | 9/2010 |
| JP | 2010-271765 A | 12/2010 |
| JP | 2010-538361 A | 12/2010 |
| JP | 2013-526739 A | 6/2013 |
| JP | 2013-539121 A | 10/2013 |
| JP | 2014-507719 A | 3/2014 |
| WO | WO-2007/141849 A1 | 12/2007 |
| WO | WO-2009/110290 A1 | 9/2009 |
| WO | WO-2010/035315 A1 | 4/2010 |

OTHER PUBLICATIONS

"International Application No. PCT/CN2015/091589, Written Opinion dated Jan. 7, 2016", 4 pgs.
"International Application No. PCT/CN2015/091655, International Search Report dated Jan. 8, 2016", 6 pgs.
"International Application No. PCT/CN2015/091655, Written Opinion dated Jan. 8, 2016", 5 pgs.
"International Application No. PCT/CN2015/091664, International Search Report dated Jan. 12, 2016", 6 pgs.
"International Application No. PCT/CN2015/091664, Written Opinion dated Jan. 12, 2016", 4 pgs.
"U.S. Appl. No. 14/516,314, Non Final Office Action dated May 9, 2017", 19 pgs.
"U.S. Appl. No. 14/516,314, Reponse filed Apr. 18, 2017 to Final Office Action dated Nov. 25, 2016", 12 pgs.
"U.S. Appl. No. 14/580,044, Restriction Requirement dated Apr. 6, 2017", 7 pgs.
"U.S. Appl. No. 14/580,044, Final Office Action dated Mar. 19, 2018", 16 pgs.
"European Application No. 15850559.4, Response filed Apr. 4, 2018 to Extended European Search Report dated Sep. 13, 2017", 32 pgs.
"European Application No. 15850680.8, Response filed Jan. 30, 2018 to Extended European Search Report dated Aug. 21, 2017", 48 pgs.
"European Application No. 15851575.9, Response filed Mar. 1, 2018 to Extended European Search Report dated Aug. 10, 2017", 101 pgs.
"U.S. Appl. No. 14/516,314, Final Office Action dated Aug. 28, 2017", 13 pgs.
"U.S. Appl. No. 14/516,314, Notice of Allowance dated Dec. 20, 2017", 14 pgs.
"U.S. Appl. No. 14/516,314, Response filed Aug. 1, 2017 to Non Final Office Action dated May 9, 2017", 13 pgs.
"U.S. Appl. No. 14/516,314, Response filed Nov. 28, 2017 to Final Office Action dated Aug. 28, 2017", 13 pgs.

(56) References Cited

OTHER PUBLICATIONS

"U.S. Appl. No. 14/580,044, Non Final Office Action dated Sep. 7, 2017", 20 pgs.
"U.S. Appl. No. 14/580,044, Response filed May 26, 2017 to Restriction Requirement dated Apr. 6, 2017", 17 pgs.
"U.S. Appl. No. 14/580,044, Response filed Dec. 7, 2017 to Non Final Office Action dated Sep. 7, 2017", 22 pgs.
"European Application No. 15850559.4, Extended European Search Report dated Sep. 13, 2017", (Sep. 13, 2017), 12 pgs.
"European Application No. 15850680.8, Extended European Search Report dated Aug. 21, 2017", (Aug. 21, 2017), 23 pgs.
"European Application No. 15851575.9, Extended European Search Report dated Aug. 10, 2017", (Aug. 10, 2017), 21 pgs.
"U.S. Appl. No. 14/516,314, Advisory Action dated Feb. 21, 2017", 4 pgs.
"U.S. Appl. No. 14/516,314, Final Office Action dated Nov. 25, 2016", 26 pgs.
"U.S. Appl. No. 14/516,314, Non Final Office Action dated Jun. 22, 2016", 16 pgs.
"U.S. Appl. No. 14/516,314, Response filed Feb. 6, 2017 to Final Office Action dated Nov. 25, 2016", 11 pgs.
"U.S. Appl. No. 14/516,314, Response filed Sep. 13, 2016 to Non Final Office Action dated Jun. 22, 2016", 9 pgs.
"Japanese Application Serial No. 2017-520876, Office Action dated Jun. 5, 2018", (w/ English Translation), 25 pgs.
"Japanese Application Serial No. 2017-520886, Office Action dated Jun. 5, 2018", (w/ English Translation), 5 pgs.
"U.S. Appl. No. 14/580,044, Non Final Office Action dated Jun. 20, 2018", 18 pgs.
"U.S. Appl. No. 14/580,044, Response filed May 10, 2018 to Final Office Action dated Mar. 19, 2018", 20 pgs.
"Japanese Application No. 2017-520922, Notice of Reasons for Rejection dated Jun. 26, 2018", (Jun. 26, 2018), 23 pgs.
"Chinese Application No. 201580029078.9, First Office Action dated Aug. 28, 2018", (w/ English Translation), 46 pgs.

* cited by examiner

FAST SMP/ASMP MODE-SWITCHING HARDWARE APPARATUS FOR A LOW-COST LOW-POWER HIGH PERFORMANCE MULTIPLE PROCESSOR SYSTEM

CROSS-REFERENCE TO RELATED APPLICATION(S)

This application is a continuation-in-part of prior U.S. patent application Ser. No. 14/580,044 filed on Dec. 22, 2014, which is a continuation-in-part of prior U.S. patent application Ser. No. 14/516,314 filed on Oct. 16, 2014, which both are incorporated herein by reference.

TECHNICAL FIELD

The present invention relates generally to multiple processor architectures and systems, and more particularly, to an apparatus and method for mode switching between asymmetric and symmetric multi-processing modes in a multiprocessor system.

BACKGROUND

Multi-processing systems utilize multiple processors (e.g., central processing units (CPU)) to process data and perform desired functions. As will be appreciated, the term "processor" is used synonymously with the terms "CPU" or "core" and is readily understood by those skilled in the art. In the prior art, there exist two main types of disparate multi-processing systems: Symmetric multi-processing (SMP) and asymmetric multi-processing (ASMP).

SMP systems are typically characterized by the sharing of all system resources, a single synchronous L2 cache interface (and possibly asynchronous L2), processors are controlled at the same clock frequency and clock voltage. This also generally means the processors/cores are equally accessible to the shared memory system (such as L2 cache and memory). In SMP, clock frequencies and voltages are not individually adjustable and, therefore, cannot be changed on a per core/processor basis. In addition, the L2 cache is shared among all cores and the L2 cache frequency is not scalable on a per core basis. In most, if not all applications, workloads of the processors in SMP are unbalanced and this leads to higher power consumption. SMP may also be characterized as treating all processors/cores equally (equality).

In contrast, ASMP systems are typically characterized by having different clock frequencies and/or clock voltages individually for processors and the L2 cache clock frequency can be independently scaled. Thus, processor clock frequency and L2 cache frequency can be scaled based on workload (e.g., faster L2 cache relative to cores for memory intensive workloads). In general terms, ASMP systems are more power efficient than SMP systems, but potentially higher power consumption may be caused by the additional and more complex hardware. When the L1 cache miss rate is high, the processor will fetch data from the L2 cache. If the requested relevant data is stored in the lower clock frequency portion of the L2 cache, the processor has to wait for the data. This leads to higher latency and higher power consumption. ASMP may also be characterized as treating all processors/cores differently or unequally (inequality).

Prior U.S. patent application Ser. No. 14/580,044 (having a filing date of Dec. 22, 2014) illustrates (in its FIG. 1) and describes the basic architecture of a processing system 100 having multiple processors employing ASMP and that a similar prior art system is utilized for SMP, however, the processors operate at a single clock frequency and using a single supply voltage level—as readily understood by persons of ordinary skill in the art. Various improvements to the basic system, including (1) a hardware-based apparatus for fast and efficient dynamic switching between SMP/ASMP modes and (2) a low-cost version of an SMP/ASMP system focused on switching from one core to two cores, with the two cores operating in ASMP mode (and when more than two cores operate, operating them in SMP mode) are described therein.

Hardware-based or hardware-implemented switching, with no intervention by software, can provide faster transitioning between SMP/ASMP modes. Accordingly, there is needed a low-cost, low-power multiprocessing system or architecture that provides fast SMP/ASMP mode switching utilizing hardware-based switching methods and apparatus.

SUMMARY

According to one embodiment, there is provided a multi-processing system including a multi-processor (MP) processing system including a voltage regulator circuit configured to receive the first supply voltage and generate the second supply voltage, wherein the second supply voltage has a voltage value less than the first supply voltage; a first processor configured to receive and operate in accordance with a first clock signal having a first predetermined frequency and the first supply voltage; and a second processor configured to receive and operate in accordance with either the first clock signal or a second clock signal having a second predetermined frequency different from the first predetermined frequency and receive and operate in accordance with the first supply voltage or the second supply voltage. The system also includes a controller coupled to the voltage regulator circuit and configured to generate a bypass signal for selectively inputting the first supply voltage or the second supply voltage to the second processor, and the first processor is further configured to only receive and operate in accordance with the first clock signal and the first supply voltage during both a first mode and a second mode of operation.

In accordance with another embodiment, there is provided an apparatus, comprising having a plurality of processors configured to perform multiprocessing functions, including a first processor and a second processor. A controller is configured to control operation of the second processor in a first mode and a second mode, a clock generation circuit is coupled to the controller and configured to generate and output a first clock signal and a second clock signal in response to one or more signals from the controller, and a switching circuit is disposed between the clock generation circuit and the second processor and configured to receive the first and second clock signals and select one for output to the second processor, wherein during the first mode of operation the first clock signal is output to the second processor and during the second mode of operation the second clock signal is output to the second processor. The apparatus also includes a voltage regulator and bypass circuit coupled to the controller and configured to: receive a first operating voltage signal, generate a second operating voltage signal from the first operating voltage signal, output the first operating voltage signal for input to the second processor during the first mode of operation, and output the second operating voltage signal for input to the second processor during the second mode of operation. During the first mode of operation and the second mode of operation, the first clock signal is input to the first processor.

According to yet another embodiment, there is provided a method of switching a plurality of processors between a symmetric multiprocessing (SMP) mode and an asymmetric multiprocessing (ASMP) mode. The method includes operating a first processor in accordance with a first clock signal having a first predetermined frequency and a first supply voltage having a first predetermined operating voltage while the first processor is operating; generating a second supply voltage from the first supply voltage; receiving a mode selection signal; and operating a second processor in a first mode of operation or a second mode of operation in response to the mode selection signal. In the first mode of operation, the second processor is operated in accordance with the first clock signal and the first supply voltage, and in the second mode of operation, the second processor is operated in accordance with a second clock signal having a second predetermined frequency different from the first predetermined frequency and in accordance with the second supply voltage.

In still another embodiment, there is provided a method of processing in a multiprocessor system having a plurality of processors/The method includes processing within the multiprocessor system using only a first active processor within the plurality of processors; determining a second processor should be activated for processing within the multiprocessor system; in response to the determination, activating the second processor; and processing within the multiprocessor system using the first active processor and the second active processor in accordance with either a symmetric multiprocessing (SMP) mode or an asymmetric multiprocessing (ASMP) mode. When in the SMP mode, the first active processor and the second active processor each operate in accordance with a first clock signal having a first predetermined frequency and a first supply voltage having a first predetermined voltage, and when in the ASMP mode, the first active processor operates in accordance with the first clock signal and the first supply voltage and the second processor operates in accordance with a second clock signal having a second predetermined frequency different from the first predetermined frequency and in accordance with a second supply voltage having a second predetermined operating voltage different from the first predetermined operating voltage. The method further includes: receiving a mode selection signal and switching operation of the first active processor and the second active processor from either the SMP mode to the ASMP mode or the ASMP mode to the SMP mode depending on the mode selection signal.

In another embodiment there is provided a multi-processor (MP) processing system having a first processor and a second processor, and a controller coupled to at least the second processor. The controller is configured to activate or deactivate the second processor in response to an activation/deactivation signal, and upon activation of the second processor, control processing within the multiprocessor system using the first processor and the second processor in accordance with either a symmetric multiprocessing (SMP) mode or an asymmetric multiprocessing (ASMP) mode. The SMP mode is defined where the first processor and the second processor each operate in accordance with a first clock signal having a first predetermined frequency and a first supply voltage having a first predetermined voltage, and the ASMP mode is defined where the first processor operates in accordance with the first clock signal and the first supply voltage and the second processor operates in accordance with a second clock signal having a second predetermined frequency different from the first predetermined frequency and in accordance with a second supply voltage having a second predetermined operating voltage different from the first predetermined operating voltage. The controller is further configured to receive a mode selection signal and switch operation of the first processor and the second processor from either the SMP mode to the ASMP mode or the ASMP mode to the SMP mode depending on the mode selection signal.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

Figure 1:
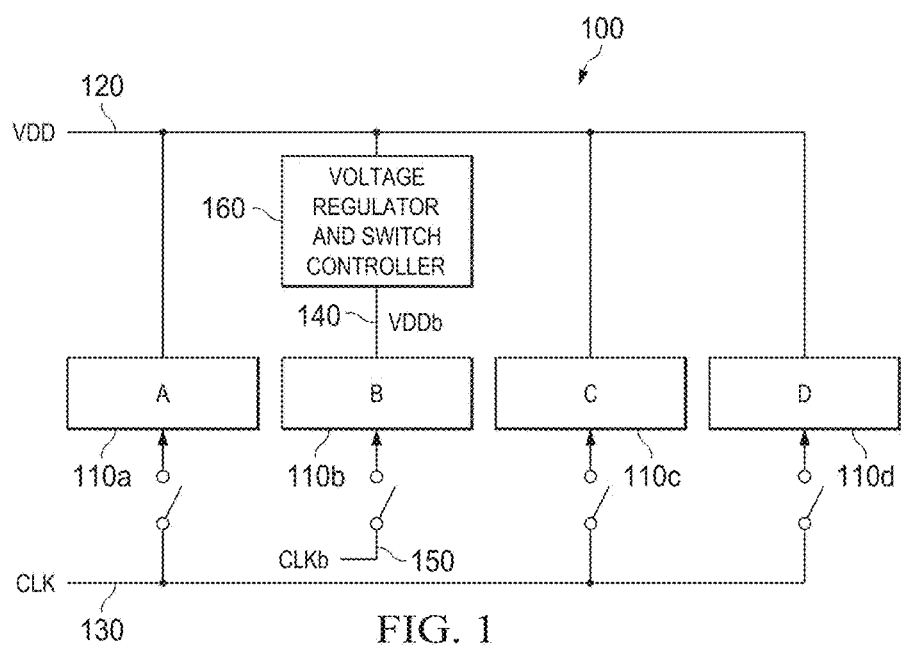
FIG. 1 illustrates in a multiprocessing (MP) system in accordance with the present disclosure.

This present disclosure incorporates by reference, as if fully set forth herein, all of the figures and description set forth in U.S. patent application Ser. No. 14/580,044 (having a filing date of Dec. 22, 2014).

FIGS. 1 through 8, discussed herein, and the various embodiments illustrated therein and principles described below of the present disclosure in this patent document are by way of illustration only and should not be construed in any way to limit the scope of the invention. Those skilled in the art will understand that the principles described herein may be implemented in any type of suitably arranged device(s) or system(s).

As described in U.S. patent application Ser. No. 14/580,044, when switching operation of a group of processors/cores from a fully SMP system to a fully ASMP system, the cost and complexity (hardware/software) associated with providing this SMP/ASMP dynamic switching functionality may be significant. For smaller devices (e.g., mobile devices, handheld devices, smartphones, etc. in mobile applications—as opposed to supercomputing devices and applications), it has been determined through investigation and testing that in most use applications, multiprocessing tasks/functions can be adequately handled using two (or less) processors/cores. In most of these applications, the two processors/cores will be running with unbalanced loads resulting in higher power consumption.

Therefore, U.S. patent application Ser. No. 14/580,044 describes a low cost, low power and high performance multi-processing system capable of operating in an ASMP manner—but in which only a single processor/core (or subset) of the processors/cores is configured and enabled for dynamic switching between different clock frequencies and/or different operating supply voltages—and with the remaining processors/cores configured at a same clock frequency and a same supply voltage. For example, if the multiprocessor system includes two processors/cores, a first processor/core operates at a first clock frequency (not dynamically changeable) and a first supply voltage (not dynamically changeable) and the second processor/core is switchable between operation at either that first frequency and first supply voltage (the same as the first processor/core) or a different frequency and different supply voltage. This may also be applied in a system having three or more processors/cores in which at least one of the processor/cores (or subset) has this dynamic switching capability.

To improve efficiency and switching latency, the present disclosure provides a system having a hardware-based switching apparatus that enables control and switching between the two modes. Within the hardware, upon receipt of a switching command from the operating system (OS) or other software/hardware, to switch between SMP and ASMP, a series or sequence of actions is performed to control clocks and voltages to the multiple processors and memory. The apparatus/method minimizes or eliminates software/OS intervention and has faster mode-switch speed.

As used herein, the term SMP generally refers to processing using multiple processors/CPUs/cores operating at a same clock (frequency) and same voltage supply utilizing a shared memory system (with L2 cache memory operating with the same clock and voltage supply). The term ASMP generally refers to processing using multiple processors/CPUs/cores with at least two operating with a different clock (frequency) and/or voltage supply. In ASMP, typically the processors each utilize different L2 cache memory. However, ASMP may also include sharing of the same L2 cache memory (referred to as heterogeneous ASMP). In another aspect, the term ASMP refers to multi-processing using multiple processors/CPUs/cores in which each processor/CPU/core is configured to operate using at least either a first clock frequency and a first supply voltage or a second clock frequency and a second supply voltage. In addition, the ASMP mode generally refers to multi-processing using a group (multiple) of cores in which at least one core (or more, but less than all cores) capable of operating using the same clock frequency and same supply voltage as the other cores within the group is dynamically switched or configured to use a different clock frequency and supply voltage. In this way, the group of cores operates in either SMP mode or ASMP mode, but at least one (not all) in the group has a different clock frequency and supply voltage.

As will be appreciated, the term "core" used herein can refer to a single processor, CPU or processing core. The definition can also be extended to describe or refer to a "core" having multiple processors, CPUs or processing cores. Thus, the use of the term "core" herein is not limited to a single processing element, but can include a group of the same processing elements. In addition, the terms "core", "processor" and "CPU" can be, and are, used interchangeably herein.

Now turning to FIG. 1, there is shown a multiprocessing (MP) system 100 in accordance with the present disclosure. An MP system 100 include Cores A, C and D (110a, 110c, 110d) coupled to a first operating voltage supply 120 (VDD) and to a single clock signal 130 (CLK), while Core B (110b) is coupled to a second voltage supply 140 (VDDb) and to a clock signal 150 (CLKb). In this configuration, the Core B is coupled to the second voltage supply 140 (VDDb) derived from the first operating voltage supply 120 (VDD). A voltage regulator and switch controller 160 receives the first operating voltage supply (VDD) and generates the second voltage supply (VDDb). Though not shown in FIG. 1, the voltage regulator and switch controller outputs either VDDb or VDD to the Core B (depending on the mode selected). Thus, VDDb is derived from VDD. In various embodiments, the voltage regulator and switch controller 160 is constructed or disposed with the system 100 on the same chip or monolithic substrate, and in another embodiment may be on a different chip or substrate.

Figure 2:
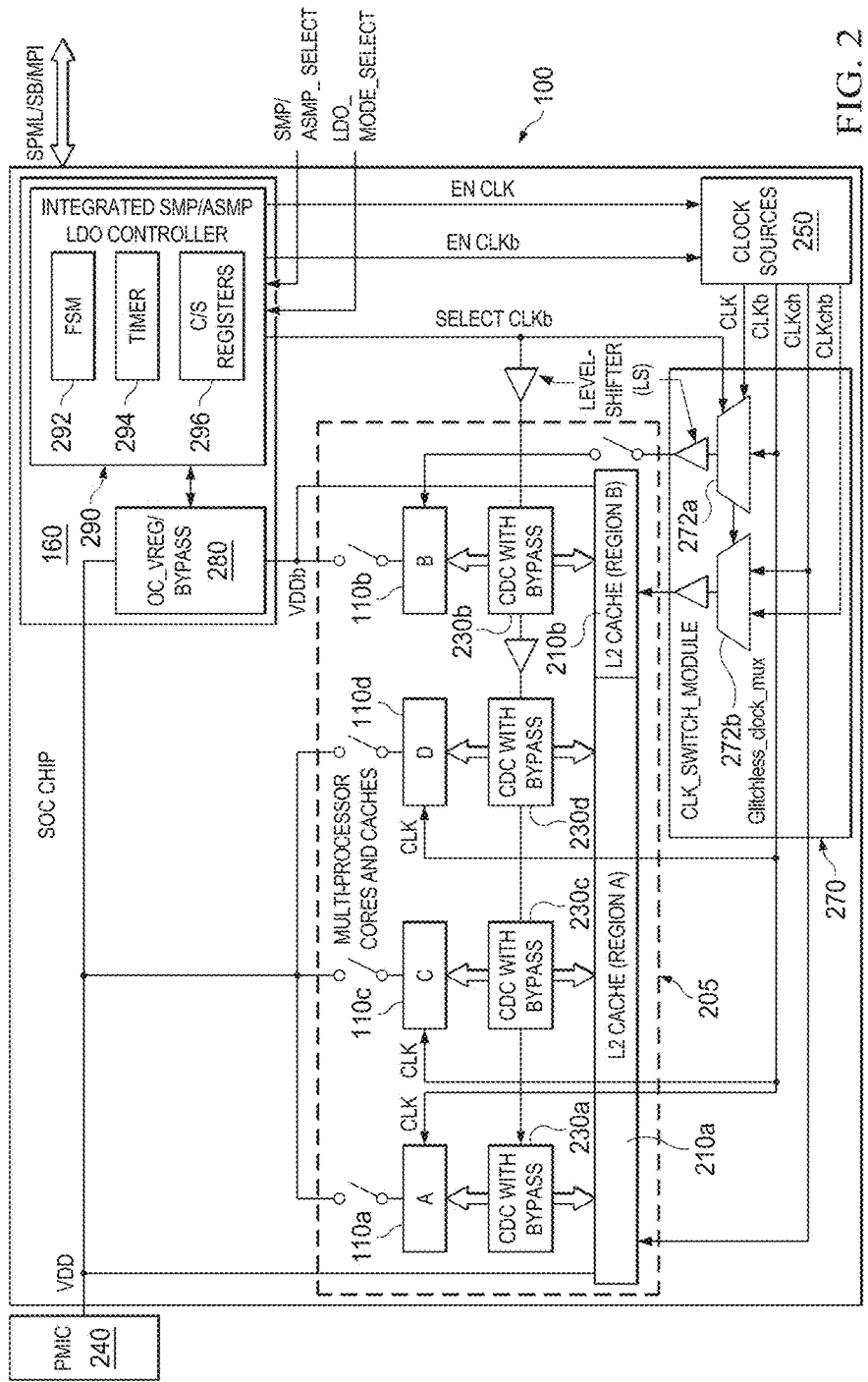
FIG. 2 is a diagram illustrating in more detail the multiprocessing system shown in FIG. 1.

Turning now to FIG. 2, there is shown a detailed diagram illustrating the processing system 100 in accordance with the present disclosure.

In general terms, the processing system 100 includes a group (multiple) of processors switchable between two modes of operation: SMP and ASMP. In SMP mode, the operating processors (e.g., one, three or all four) operate using the same clock frequency and supply voltage, while in ASMP mode (in the different embodiments described below), at least one first processor is configured to operate using a clock frequency and a supply voltage different than those of the remaining operating processors.

The system includes a hardware apparatus/circuit that enables control and switching of the first processor between two different clock frequencies and supply voltages. Within the hardware, upon receipt of a switching command from the operating system (OS) or other software/hardware, to switch between SMP and ASMP, a series or sequence of actions are performed to control a clock and voltage of the first processor and memory. The generation of the switching command can be based on one or more factors, as desired, such as loading, cache miss rate, power consumption reasons, etc. The apparatus/circuit ensures that the first processor does not fail during the transition from one mode to the other and clock(s) to the processors/memory are switched glitchlessly. The apparatus/method minimizes software/OS intervention and has faster mode-switch speed.

The processing system 100 includes a multi-processor cores and caches subsystem 205 having multiple processors 110, which includes 110a (CPU A), 110c (CPU C), 110d (CPU D) and 110b (CPU B) with corresponding L2 cache memory portions 210 (210a and 210b), and corresponding cross-domain clock (CDC) circuits 230a, 230c, 230d, 230b, as illustrated. While four processors 110 (and corresponding memory and circuitry) are shown, the number of processors could be fewer or greater, but will include at least two. As will be appreciated, each processor 110 may include one or more processors, central processing units (CPUs), processors, or cores, or combination thereof.

The processing system 100 further includes a power management control (PMIC) circuit 240 for generating the first operating supply voltage (VDD) for use in supplying power to the processors, caches and CDCs. Similarly, a clock generation circuit 250 generates multiple clock signals having various predetermined clock frequencies for use in clocking operation of the processors, caches and CDCs.

In one embodiment, with the exception of the PMIC circuit 240, the processing system 100 is disposed or otherwise located on a single substrate/die or integrated semiconductor substrate/die (or within multiple semiconductor substrates disposed within a multi-substrate IC package). In another embodiment, the PMIC circuit 240 may also be included on the single substrate/die or integrated semiconductor substrate/die.

As illustrated, the processing system 100 also includes the voltage regulator and switching controller 160 (which may also be referred to as a switch or mode controller) and a clock switching circuit (or module) 270. As will be understood, the controller 160 outputs various control signals for controlling the functionality and operation of the CDC with bypass circuits 230, the clock generation circuit 250, and the clock switching circuit 270.

The clock generation circuit 250 includes the necessary circuitry and elements for generating multiple clock signals, including one SMP processor clock signal (CLK) for controlling operational speed of the processors 110 collectively (in SMP mode), one SMP memory clock signal (CLKch) for controlling operational speed of the cache portions 210a, 210b collectively (in SMP mode), at least one ASMP processor clock signal (CLKb) enabling independent control of the operational speed of the processor 110b, and at least one ASMP memory clock signal (CLKchb) enabling independent control of the operational speed of the cache memory portion 210b. Each of these clocks are enabled/disabled glitchlessly by the circuit 250. The clock generation circuit 250 also receives input enable signals EN_CLK and EN_CLKb generated by the controller 160.

The PMIC circuit 240 includes the necessary circuitry and elements for generating at least VDD for use in the system 100. As illustrated, the PMIC circuit 240 generates and outputs VDD for supplying power to the processors 110a, 110c, 110d, the cache memory portion 210a and the voltage regulator and switching controller 160. As shown, supply voltage VDDb supplies power to the processor 110b and its associated cache memory portion 210b. As understood by those skilled in the art, when a processor/memory operates at a higher clock speed, it is desirable and may be necessary to also operate the processor/memory with a higher supply voltage. In addition, when a core is not used, it may be power collapsed and/or clock-disabled. For example, the supply voltage VDDb to the processor 110b may be disabled and/or the clock input to the processor 110b may be disabled (e.g., no input clock). Similarly, the supply voltage VDD and/or clock inputs to the processors 110a, 110c, 110d may be disabled. This functionality may be provided by one or more switches (shown in FIG. 2, but not identified with reference numerals).

The clock generation circuit 250 may also include functionality and circuitry enabling some programmability to each of the generated clock signals CLK and/or CLKb. In one embodiment, each of the clock signals may be programmable to one of many possible frequencies (e.g., the CLK may be programmable between a range such as 300 Mhz to 3 GHz). In another embodiment, only certain clock signals may be programmable, while in other embodiments, the frequency of each clock signal is predetermined and fixed. In yet another embodiment, the frequencies may be fixed relative to each other, but may be programmable as a group. Similarly, the PMIC circuit 240 may also include functionality and circuitry to provide programmability to the operating voltage supply VDD.

As shown in FIG. 2, the controller 160 includes a voltage regulator and bypass circuit 280 and an SMP/ASMP switch controller 290. A voltage regulator (not separately shown) within the voltage regulator and bypass circuit 280 generates the voltage supply VDDb from the operating voltage supply VDD and selectively outputs either VDD or VDDb. In a bypass mode, VDDb=VDD. In addition, VDDb may be power-collapsed by disabling the voltage regulator thereby shutting down the Core B (110b). As will be appreciated, and in general terms, the bypass function for the voltage regulator can be implemented using a multiplexer and controlled by a state machine or other process.

In other embodiments, the controller 160 may receive VDD and generate (programmable) one of many possible voltage levels (e.g., the voltage may be programmable between a range such as 0.5 volts and 3.3 volts) from VDD as the voltage supply VDDb. In yet another embodiment, the voltage supply VDDb is predetermined and fixed.

The SMP/ASMP switch controller 290 includes a finite state machine (FSM) 292, one or more timers 294, and one or more storage registers 296 (e.g., configuration or status registers). The controller 290 functions to control and perform a sequence of actions or processes in response to assertion of an SMP/ASMP mode switch command/signal (SMP/ASMP_SELECT) and a voltage supply mode switch command/signal (LDO_MODE_SELECT). Therefore, in the illustrated embodiment, when the SMP/ASMP mode switch command is asserted/unasserted, the processing mode of operation is switched between the ASMP mode and the SMP mode. Various methods and mechanisms may be used for generation of the SMP/ASMP mode switch command, and some examples are described below with respect to FIG. 7. It will be understood that the SMP/ASMP mode switch command (SMP/ASMP_SELECT) and the voltage supply mode switch command/signal (LDO_MODE_SELECT) may be generated in response to various events and by various elements within or external to the processing system 100.

In one embodiment, in addition to the SMP/ASMP mode switch command (SMP/ASMP_SELECT), the controller 290 integrates use of the voltage supply mode switch command/signal (LDO_MODE_SELECT) to control and perform a sequence of actions or processes in response thereto.

When it is time for actual switch over from the CLK clock (SMP) to the CLKb clock (ASMP) to occur for processor 110b (and vice versa), the controller 290 generates a selection signal (SELECT_CLKb) that selectively multiplexes the CLKb clock signal to the processor 110b using a multiplexer 272a within the clock switching circuit 270. As understood, the clocks for the processor/CPU core 110b in the ASMP mode is denoted CLKb, while the clock for the remaining processor/CPU cores 110a, 120c, 110d in the SMP mode is denoted CLK. Thus, the SELECT_CLKb signal glitchlessly selects which clock (CLKb or CLK) will be utilized by the processor 110b. In one embodiment, when SELECT_CLKb signal is asserted (logic high or "1"), the clock signal CLKb is selected and input to the processor/core 110b. When SELECT_CLKb signal is unasserted (logic low or "0"), the clock CLK is selected and input to the processor/core 110b.

As understood, when SELECT_CLKb is asserted (logic high or "1"), the clock signal CLKb is selected and input to the processor/core 110b, while the clock signal CLK is input to the remaining processors/cores 210a, 210c and 210d. When SELECT_CLKb is unasserted (logic low or "0"), the clock signal CLK is selected and input to the processor/core 110b, while the clock signal CLK is also input (or available for input) to the remaining processors/cores 110a, 110c and 110d.

Similarly, the selection signal (SELECT_CLKb) correspondingly selectively multiplexes the CLKchb memory clock signal to the cache portion 210b using a multiplexer 272b within the clock switching circuit 270.

Using enable signals (EN_CLK, EN_CLKb), the switch controller 290 controls the clock generation circuit 250 to enable the clocks prior to SMP/ASMP switching. The controller 290 also controls the voltage regulator and bypass circuit 280 to select either VDD or VDDb for input to the processor 110*b* (Core B). It also generates the SELECT_CLKb signal which, when asserted, causes the processor 110*b* to switch to a different clock speed (CLKb) and supply voltage VDDb (in the ASMP mode) while at least one other processor 110*a*, 110*c*, 110*d* operates at clock speed (CLK) and supply voltage VDD.

The timing of various events and actions during the switching is controlled by the FSM 292 with the use of the one or more timers 294. As will be described in more detail below, a clock warm-up period and a voltage ramp up/ramp down period are utilized. These values can be pre-programmed or pre-set and stored in the C/S registers 296 or other memory locations (none shown) in the controller by software or other methods.

As will be appreciated, and though not specifically identified with reference numerals, various other logic circuits can be included, such as for example, level shifters. Level shifters are typically utilized when a signal crosses power domains.

One possible circuit implementation of the clock multiplexers 272 (shown in FIG. 2) is described in U.S. patent application Ser. No. 14/580,044 (with reference to FIG. 4 and its corresponding description). The clock multiplexers 272 are "glitchless" which means there is no glitch during switching. Other suitable circuit implementations may be utilized for the clock multiplexers 272, and those of ordinary skill in the art will readily understand other circuits can be used that perform glitchless multiplexer switching.

One possible circuit implementation of the CDC with bypass circuits 230 (shown in FIG. 2) is described in U.S. patent application Ser. No. 14/580,044 (with reference to FIG. 5 and its corresponding description). As will be appreciated, the asynchronous CDC circuits are known in the art and, therefore, persons of ordinary skill the art will understand how to implement such functionality. These CDC circuits and/or their functionality may also be known in the art as clock-switching circuits, or as an asynchronous FIFO bridge between the processor and L2 cache.

Figure 3A:
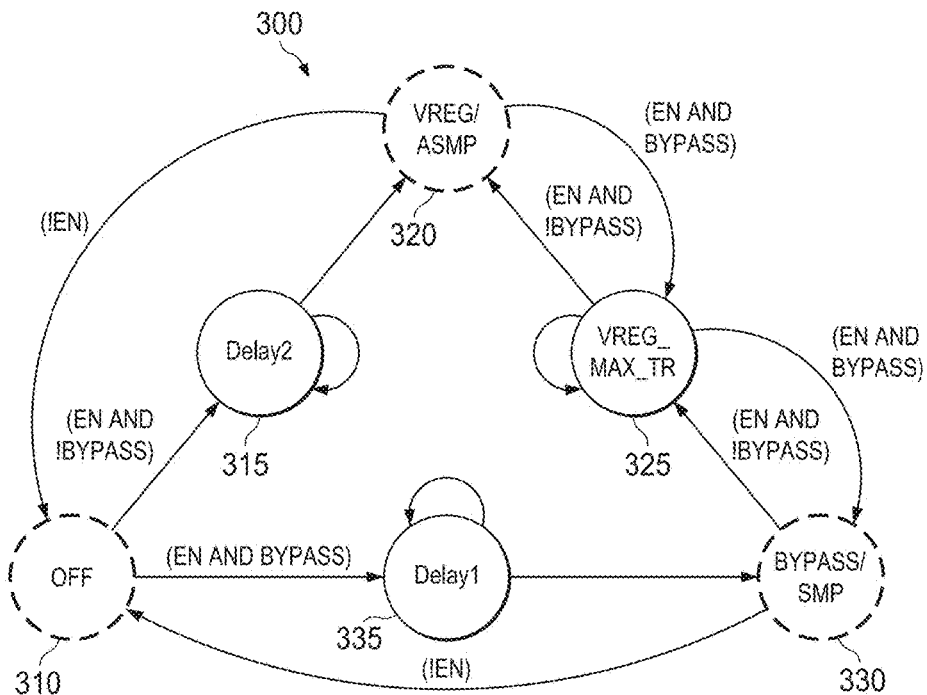
FIGS. 3A and 3B illustrate example finite state machines (FSM) and processes for use with the system shown in FIG. 2 according to the present disclosure.

Now turning to FIG. 3A, there is illustrated one process or method 300 performed or implemented by the FSM 292. This process also functions to control operation of the voltage regulator and bypass circuit 280. As will be appreciated, process/functionality of the FSM 292 may be implemented using different configurations, methods or structures (or combinations thereof) or methods. For example, although implemented in the illustrated embodiment as a finite state machine (e.g., hardware implementation), the controller 290 functionality may alternatively be implemented using discrete logic circuits, a microcontroller with firmware, etc., and any combination thereof, or in any other manner/way known to those skilled in the art. Though not preferred, this functionality may also be implemented in software or some combination of software and hardware. The FSM 292 (and any other hardware implementations) advantageously operates at a faster speed and minimizes software/OS intervention. In the event of exceptions, e.g., timeout, etc., it will generate an interrupt to the system processor.

It will also be understood that, in another embodiment, a separate FSM (or other functionality) within the controller 290 may also control the timing and generation of the EN_CLK, EN_CLKb and SELECT_CLKb signals. And in another embodiment, described further below, the FSM 292 is an "integrated" finite state machine that controls, in an integrated manner, both the timing and generation of (1) the signals (EN, BYPASS) controlling the voltage regulator and bypass circuit 280, and (2) the signals (EN_CLK, EN_CLKb and SELECT_CLKb) controlling clock generation circuit 250, the clock switching circuit 270 and the CDC and bypass circuits 230. In this "integrated" embodiment, the FSM 292 receives as input signals the SMP/ASMP mode switch command/signal (SMP/ASMP_SELECT) and the voltage supply mode switch command/signal (LDO_MODE_SELECT). Table I below illustrates input-to-output signal transitions performed by the FSM 292 (controller 290) in which the signals EN (enable) and BYPASS (bypass) are output signals generated in response to the input signals to control the mode of the voltage regulator and bypass circuit 280:

TABLE 1

| SMP/ASMP_SELECT/<br>LDO_MODE_SELECT | EN/BYPASS | VOLTAGE MODE |
|---|---|---|
| 0/0 | 0/0 | OFF |
| 0/1 | 1/1 | BYPASS |
| 1/0 | 0/0 | OFF |
| 1/1 | 1/0 | REG |

Table 2 below provides definitions/descriptions for the SMP/ASMP_SELECT and LDO_MODE_SELECT signals:

TABLE 2

| SMP/ASMP_SELECT (1-bit) | To select SMP/ASMP mode, 0-SMP mode, 1-ASMP mode |
|---|---|
| LDO_MODE_SELECT (1-bit) | For LDO ON/OFF control 0-OFF, 1-ON |

Figure 5:
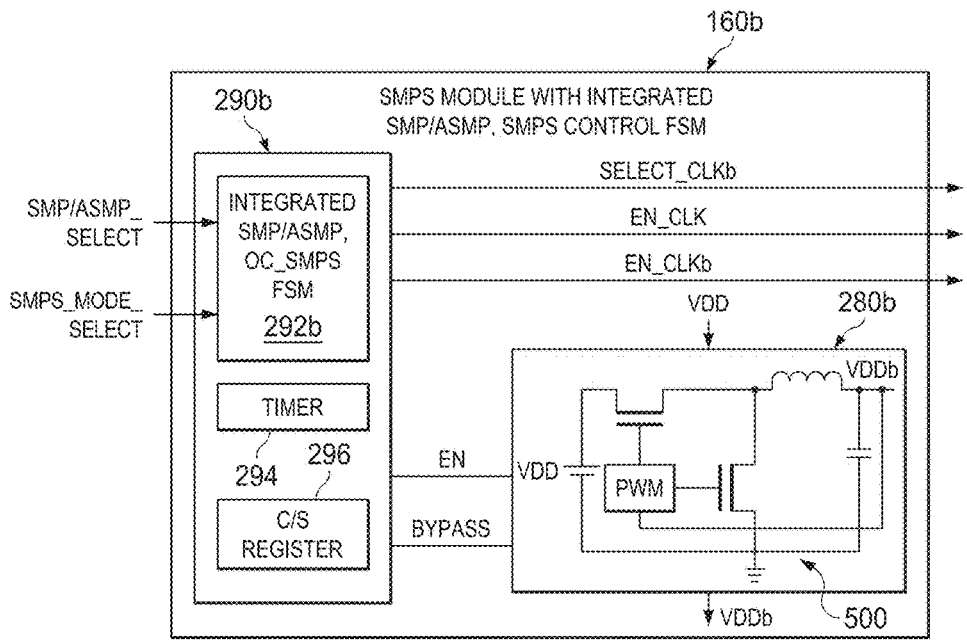
FIG. 5 is a diagram illustrating another implementation of the voltage regulator and switch controller shown in FIG. 2.
Figure 6:
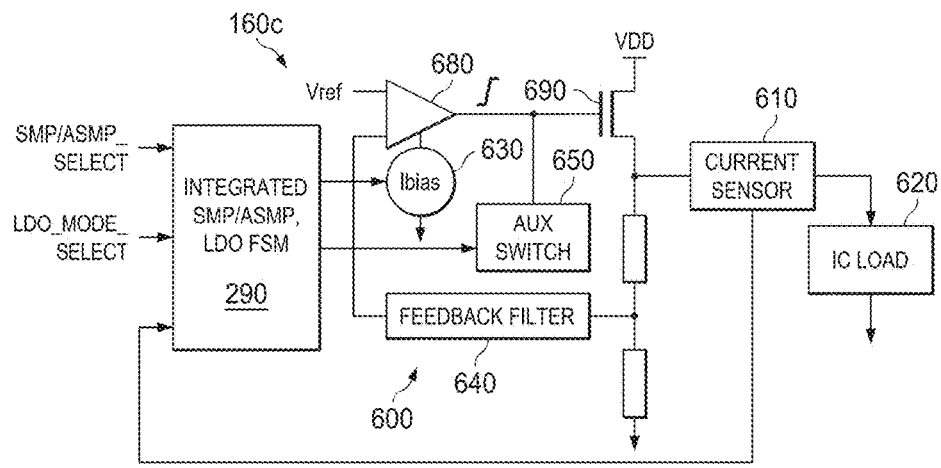
FIG. 6 illustrates another embodiment of the voltage regulator and switch controller shown in FIG. 2.

The control signals EN and BYPASS are generated and output by the by the FSM 292 to control the voltage regulator and bypass circuit 280. The input signals (SMP/ASMP_SELECT, LDO_MODE_SELECT) and output signals (EN, BYPASS, SELECT_CLKb, EN_CLK, EN_CLKb) of the controller 290 (e.g., FSM 292) are illustrated in FIGS. 5 and 6.

As shown in FIG. 3A, the process 300 represented by the state diagram of the FSM 292 includes various states and transitions relating to the control of the voltage regulator and bypass circuit 280. As shown, there are three main states— an OFF state (310), an ASMP mode state (320) and an SMP mode state (330).

The OFF state (310) is characterized by the voltage regulator being off or inactive (e.g., floating)—when the EN signal and BYPASS signal are low (e.g., EN!, BYPASS!) in response to the LDO_MODE_SELECT signal being low.

The ASMP mode state (320) is characterized by the voltage regulator outputting VDDb for selective input to provide supply voltage to the processor 110*b*-when the EN signal is high and BYPASS signal is low (e.g., EN, BYPASS!) in response to the SMP/ASMP_SELECT signal being low and the LDO_MODE_SELECT signal being high.

The SMP mode state (330) is characterized by the voltage regulator being "bypassed" and outputting VDD for selective input to provide the supply voltage to the processor 110*b*-when the EN signal is high and BYPASS signal is high (e.g., EN, BYPASS) in response to the SMP/ASMP_SELECT signal being high and the LDO_MODE_SELECT signal being high.

During operation, and assuming the processing system 100 is initially inactive, the LDO_MODE_SELECT signal is low which results in the EN signal output from the switch controller 290 being unasserted (!EN) (and the value of the BYPASS signal is not relevant). Upon activation of the LDO_MODE_SELECT signal, the switch controller 290 asserts the EN signal (EN) and the process 300 can proceed to either states 320 or 330—depending on the value of the switch command (SMP/ASMP_SELECT) signal.

If the switch command SMP/ASMP_SELECT indicates operation in the ASMP mode (SMP/ASMP_SELECT is low), the controller will output a low BYPASS signal (!BYPASS). Based on these values for the EN and BYPASS signals, the FSM 292 transitions toward to the ASMP mode state 320. However, prior to entering state 320, a Delay2 state (315) is entered which provides a predetermined amount of time (waiting period) for delay before the FSM 292 outputs the low BYPASS signal and entering the ASMP mode state 320. Delay2 may be any suitable time period range, e.g., sub-microseconds to 10 s of microseconds, depending on the physical operating characteristics of the type of voltage regulator utilized to generate VDDb. In other words, output of the low BYPASS signal is delayed for Delay2 to allow the voltage regulator to activate and stabilize to generate VDDb for output (i.e., warmup).

If the switch command indicates operation in the SMP mode, (SMP/ASMP_SELECT is high), the controller will output a high BYPASS signal (BYPASS). Based on these values for the EN and BYPASS signals, the FSM 292 transitions toward to the SMP mode state 330. However, prior to entering state 330, a Delay1 state (335) is entered which provides a predetermined amount of time (waiting period) for delay before the FSM 292 outputs the high BYPASS signal and enters the SMP mode state 330. Similar to Delay2, the Delay1 may be any suitable time period range, e.g., sub-microseconds to tens of microseconds, depending on the physical operating characteristics of the type of voltage regulator utilized to generate VDD. In other words, output of the high BYPASS signal is delayed for Delay1 to allow for the generator to generate a stabilized output and for reducing switching noise (e.g., from tristate/zero output to the VDD).

Once in either the ASMP or SMP mode, the process 300 may switch between these two modes depending on the value of the switch command (SMP/ASMP_SELECT) signal.

Figure 4:
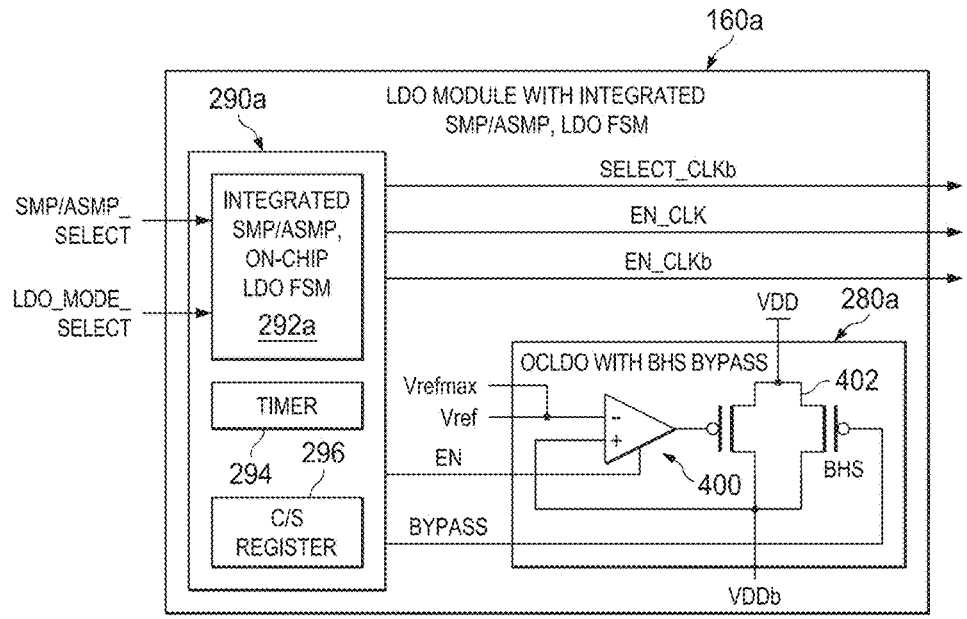
FIG. 4 is a diagram illustrating one implementation of the voltage regulator and switch controller shown in FIG. 2.

When in ASMP mode 320, if the switch command signal indicates the system should switch to SMP mode (i.e., SMP/ASMP_SELECT is high), the controller 290 will assert the BYPASS signal (BYPASS) and the process transitions toward the SMP mode state 330. However, before entering state 330, an intermediate VREG_MAX state 325 is entered which provides another predetermined delay period to allow/enable the voltage regulator output to increase to its maximum output voltage level. As will be appreciated, because the voltage regulator is already outputting the predetermined voltage supply VDDb to the processor—which is lower than VDD—it is important to ramp up the output voltage of the voltage regulator 400 to its maximum (slightly less than VDD) before switching from VDDb to VDD. This reduces or eliminates a potential large spike in the supply voltage that is input to the processor 110b. With reference to FIG. 4, the Vref or Vrefmax is selectively input to the voltage regulator to control the output value (the output of the voltage regulator is equal to the input on the negative terminal of the amplifier). For example, when VDD is 1.0 volts, Vref may be 0.6 volts, with Vrefmax equal to 0.9 volts (the practical maximum value output from the voltage regulator having VDD as its supply).

In this intermediate VREG_MAX state 325, Vrefmax is selectively input to the voltage regulator and a predetermined delay enables the output voltage to ramp up to Vrefmax before switching the output of the bypass circuit 280 from VDDb to VDD.

When in the SMP mode 330, if the switch command signal indicates the system should switch to ASMP mode (i.e., SMP/ASMP_SELECT is low), the controller 290 deasserts the BYPASS signal (!BYPASS) and the process transitions toward the ASMP mode state 320. However, before entering state 330, the intermediate VREG_MAX state 325 is entered which provides another predetermined delay period to allow/enable the voltage regulator output to decrease and stabilize, and to reduce noise.

As shown, when in either the ASMP mode state 320 or the SMP mode state 330, and the LDO_MODE_SELECT signal goes low, the EN signal is deasserted (!EN), the process transitions back to the OFF state 310.

It is understood that the process 300 implemented by the FSM 292 provides finite state machine control of the voltage regulator and bypass circuit 280 without integrating the control/generation of the signals (EN_CLK, EN_CLKb and SELECT_CLKb) that control the clock generation circuit 250, the clock switching circuit 270 and the CDC and bypass circuits 230 (i.e., SMP/ASMP mode clock switching)—to provide CLK or CLKb as the clocking frequency for the processor 110b. In this embodiment, a second FSM (not shown) may be included that separately operates and generates these other control signals to control these other circuits. The specific implementation of this second FSM can be readily designed by those of ordinary skill in the art with reference to U.S. patent application Ser. No. 14/580,044 (FIGS. 3A, 3B and 3C and their corresponding description).

Figure 3B:
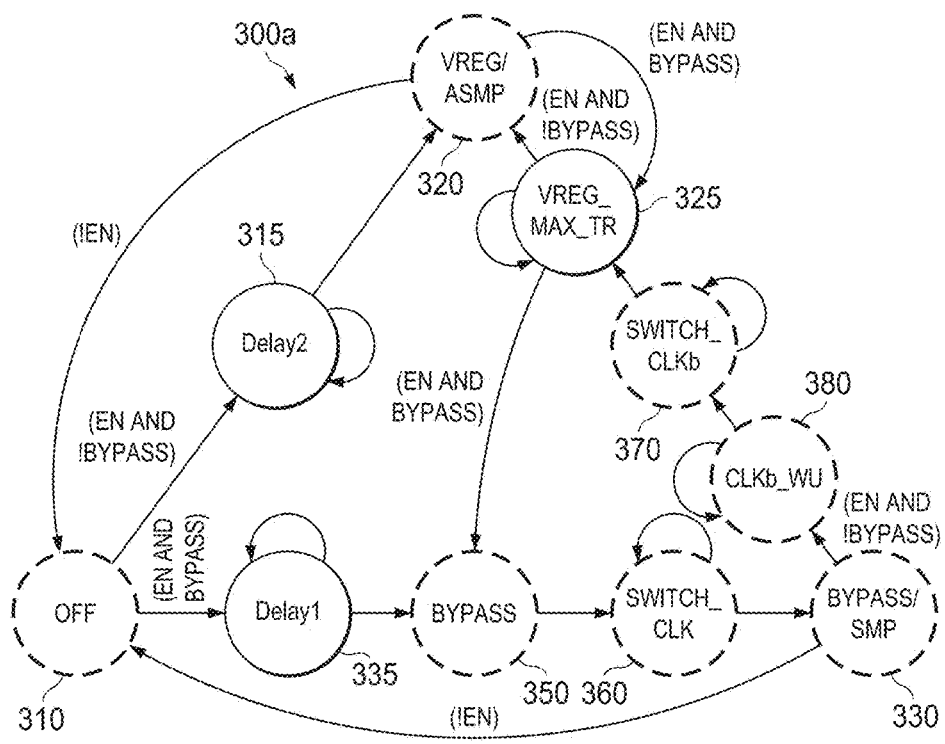

Now turning to FIG. 3B, there is illustrated another process or method 300a performed or implemented by the FSM 292. The process 300a can be implemented by the FSM 292 which provides finite state machine control of the voltage regulator and bypass circuit 280 including integrating therein the control/generation of the signals (EN_CLK, EN_CLKb and SELECT_CLKb) that control the clock generation circuit 250, the clock switching circuit 270 and the CDC and bypass circuits 230 (i.e., SMP/ASMP mode clock switching). In other words, the process 300a describes an integrated FSM 292 (and the second FSM noted above can be omitted). This process 300a functions to control operation of both the voltage regulator and bypass circuit 280 and the clock control circuits 250, 270 and 230. In other words, the FSM 292 in FIG. 3B provides a voltage regulation and clock switching module that integrates control of the voltage regulator and bypass circuit 280 with the control/generation of the signals (EN_CLK, EN_CLKb and SELECT_CLKb) that control the clock generation circuit 250—providing an integrated controller (controlling both voltage changes/switching and clock changes/switching). Thus, control of the voltage regulator and its output (i.e., the voltage supply to the processor) and control of the clock switching circuit and its output (i.e., the clocking signal to the processor) is integrated or has one or more interdependencies. Such an integrated controller enables clock enablement/warming-up/switching processes in parallel with voltage regulator enablement/warm-up/switching processes. This improves the overall latency of the SMP/ASMP switching process.

As illustrated in FIG. 3B, the process 300a includes all of the states (310, 315, 320, 325, 330, 335) and transitions of the process 300 (shown in FIG. 3A) and additional states 350, 360, 370 and 380 and related transitions. In addition, one transition is slightly modified. The process 300a represented by the state diagram of the FSM 292 includes various states and transitions relating to control of (1) the voltage regulator and bypass circuit 280 and (2) the circuits 250, 270 and 230. The integrated finite state-machine (FSM) controls not only voltage change, but also clock-switching, and this way, it can achieve the best parallelism and optimized action sequences, while ensuring the correct interdependency is met.

The additional four main states include a transitional BYPASS state (350), a SWITCH_CLK state (360), a SWITCH_CLKb state (370), and a CLKb_WU state (380).

Within the transitioning from the OFF state (310) to the SMP mode state (330), the additional BYPASS state (350) and SWITCH_CLK state (360) are included and disposed after the Delay1 state (335), as shown. After the Delay1 time period has expired, the BYPASS state (350) is entered (though the BYPASS signal has not yet been asserted high) by the FSM 292. In the BYPASS state (350) (essentially an internal voltage regulator intermediate state), the BYPASS signal is asserted and the process transitions toward the SMP mode state 330 (and VDD is input to the processor 110b).

Upon completion, the SWITCH_CLK state (360) is entered. In the SWITCH_CLK state, the process 300a performs several functions, including: (1) asserting the EN_CLK signal high which switches on the CLK signal within the clocking circuit 250, (2) waiting for a predetermined time period enabling the CLK signal to warm-up, and (3) after warm-up, deasserting the SELECT_CLKb signal which selectively inputs the CLK signal (as opposed to the CLKb signal) to the processor 110b within the clock switching circuit 270 (see also, FIG. 2).

Within the transitioning from the SMP mode state (330) to the ASMP mode state (320), the CLKb_WU (warm-up) state (380) and the SWITCH_CLKb state (370) are included and disposed before the VREG_MAX state (325), as shown. When switching from SMP mode to ASMP mode is triggered (SMP/ASMP_SELECT becomes low), the CLKb_WU state (380) is entered. In the CLKb_WU state (280), the process 300a asserts the EN_CLKb signal high which switches on the CLKb signal within the clocking circuit 250 and waits for a predetermined time period enabling the CLKb signal to warm-up. After warm-up, the SWITCH_CLKb state (370) is entered, and the process 300a asserts the SELECT_CLKb signal which selectively inputs the CLKb signal (as opposed to the CLK signal) to the processor 110b within the clock switching circuit 270 (see also, FIG. 2). Upon completion, the process transitions to the VREG_MAX state (325) for its action(s) to occur, then toward the SMP mode state (330), and the BYPASS signal is deasserted to enter the ASMP mode state 320 (and VDDb is input to the processor 110b).

The transitioning from the ASMP mode state (320) to the SMP mode state (330) takes a different path. When switching from ASMP mode to SMP mode is triggered (SMP/ASMP_SELECT becomes high), the VREG_MAX state (325) is entered. Upon completion, the BYPASS state (350) is entered and completed, the SWITCH_CLK state (360) is entered and completed, and the process transitions to the SMP mode state 330.

Based on the process 300a implemented as a finite state machine, control and generation of the EN, BYPASS, EN_CLK, EN_CLKb, and SELECT_CLKb signals are achieved without software/OS. This results in faster switching between SMP and ASMP mode.

Now turning to FIGS. 4 and 5, there are illustrated two alternative embodiments 160a, 160b of the voltage regulator and switch controller 160 shown in FIG. 2.

FIG. 4 illustrates the voltage regulator and switch controller 160a implemented using the switch controller 290a (with FSM 292 implementing the process 300a illustrated in FIG. 3B) and the voltage regulator and bypass circuit 280a. In this embodiment, the circuit 280a includes a low dropout (LDO) voltage regulator 400 and a high-speed bypass switch 402. The reference signal (Vref), the reference maximum signal (Vrefmax) and the EN signal are input to the LDO voltage regulator 400. When enabled, the VDDb output equals VDD (when the BYPASS signal is asserted (BYPASS)) or Vref (when the BYPASS signal is deasserted (!BYPASS)). As will be appreciated, Vref can be selected (or even programmable) to a desired value. In this embodiment, actual voltage reference signal input to the voltage regulator may be selected from either Vref or Vrefmax, and either of these may be selectively input to the voltage regulator under control of the FSM 292 and appropriate switching circuitry (not shown). As described above, it may be beneficial to ramp up the output voltage from Vref value to Vrefmax value before switching the output of the circuit 280 from VDDb to VDD.

FIG. 5 illustrates the voltage regulator and switch controller 160a implemented using the switch controller 290b (with FSM 292 implementing the process 300a illustrated in FIG. 3B) and the voltage regulator and bypass circuit 280b. In this embodiment, the circuit 280b includes a switched voltage regulator 500 with the components as shown—for illustrative purposes only. Those of ordinary skill in the art will readily understand that other suitable configurations of a switch voltage regulator (e.g., switch-mode voltage regulator, bucks, integrated voltage regulators, switched-cap regulators, etc.) may be utilized (and that additional control signals may also be required). The bypass circuit functions similar to that described with respect to FIG. 4 in that when enabled, the VDDb output equals VDD (when the BYPASS signal is asserted) or VDDb (when the BYPASS signal is deasserted).

With respect to the LDO voltage regulator 400 and the switched mode regulator 500, in one embodiment, the regulator (400 or 500) may be incorporated on the same substrate or integrated circuit (as described above).

Now turning to FIG. 6, there is shown a diagram of another embodiment of a voltage regulator and switching controller 160c having a voltage regulator and circuit 600. The voltage regulator 600 illustrates a different implementation of a low-drop out voltage regulator. This architecture reduces/suppresses noise that may be generated by the SMP/ASMP mode switching using two distinct noise suppression methodologies—predictive (or pre-set) and responsive (or reactive). Each methodology minimizes noise from switching and enables faster switching. The responsive method provides a micro level of adjustment and fast response time, while the predictive method provides a macro level of adjustment. Either one or both of these mechanisms may be utilized.

When the SMP/ASMP mode switch command changes (SMP/ASMP_SELECT signal changes), the controller 290 predictively generates control signal(s) to control bias current of the amplifier (680) through a bias current control circuit 630. A feedback filter 640 operates in conjunction with the bias current control circuit 630 to increase the bias current as well as change the bandwidth and the slew rate of the power transistor (690)—as shown in FIG. 6. This change in bias current ahead of an upcoming actual SMP/ASMP transition enables the LDO voltage regulator 600 to pre-compensate for the upcoming change in di/dt. This helps alleviate or suppress SMP/ASMP switching noise. In other words, this method pre-sets the certain operational characteristics (e.g., Ibias, bandwidth, slew rate) of the voltage regulator prior to the system performing the SMP/ASMP transition. As will be appreciated, the bias control circuit 630 and the feedback filter 640 are each a control circuit.

For the responsive methodology, a current sensor 610 disposed in the current path at the output of the regulator 600 senses the amount of change di/dt drawn by a load 620 (e.g., the processor 110b). This signal is fed back to the FSM controller 290 to adjust the bias current and/or feedback loop to reduce the noise in a responsive fashion, not ahead of time in the predictive manner. An auxiliary switch 650 increases or speeds up the current draining path for a downward change of output voltage, when needed. The responsive method and circuitry shown provide functionality that is the same as, or similar to, a proportional-integral-derivative (PID) controller. Those of ordinary skill in the art may use any suitable circuitry to perform the functionality described above. As will be appreciated, the bias control circuit 630, feedback filter 640 and auxiliary switch 650 are each a control circuit.

Dynamic mode switching between SMP and ASMP is performed in one embodiment in which the ASMP mode is activated when only two processors (110b and either 110a, 110c or 110d are active) and the SMP mode is activated when three or more processors are active. The determination of whether either (1) two processors or (2) three or more processors are needed may be based on traffic type, processor wait time, load imbalance information and/or power consumption. As will be appreciated, other factors and types of information can be analyzed and form the basis of a decision to change (or maintain) modes. For example, SMP mode may be selected when load is light, or when load is heavy that all CPU cores are utilized and/or when L1 cache miss rate is high, while ASMP mode may be selected for heavy and/or unbalanced loads. In one specific embodiment, when two processors are required, the two processors operate in ASMP mode, and when three or more processors are required they operate in SMP mode.

Persons of ordinary skill in the art will readily understand that one or more of the "cores" (e.g., A, B, C, D)—may each also include two or more processors within each core. In such embodiments, each "group" of processors is categorized to function as a distinct entity (or "core").

Figure 7:
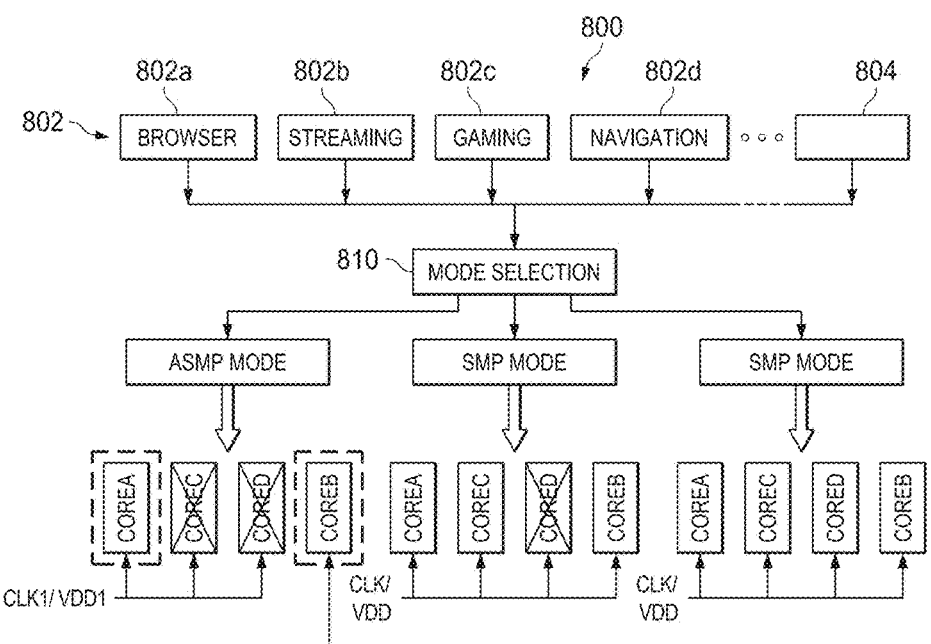
FIG. 7 is a diagram of an architecture (method, process, system) for initiating and controlling SMP/ASMP mode switching.

Turning now to FIG. 7, there is shown conceptually an architecture (e.g., method, process, system) 800 for initiating and controlling SMP/ASMP mode selection and switching. Mode selection can be based on the type of processing or application desired, as well as other information or factors. As shown, the processing or application 802 may be a browser application 802a, a streaming application 802b, a gaming application 802c or a navigation 802d. Other factors/information 804 may also be considered.

As an example, assuming the streaming application 802b requires multi-processing, a mode selection device 810 determines whether processing tasks associated with that application should be performed in the SMP or ASMP mode. The system software/OS does this determination and makes the decision. The system may allocate a single processor to issue the command to the controller, but generally the decision is implemented at system-level/OS-level. This decision may be based on static information, dynamic information or a combination thereof. In one example, it could be predetermined that all video encoding applications will use SMP mode. In another example, all video streaming applications will use ASMP mode unless the current loading of the CPU is so heavy that all CPU cores are utilized. Other variations can be programmed and utilized to render the decision about whether to switch from one mode to the other.

In one embodiment, a look-up table may be consulted when single processing tasks are required. In another embodiment, comparison of power may be a factor used to select which mode when there are multiple processing tasks. For example, when a user is working on emails while listening to music simultaneously, ASMP can be selected.

In one specific embodiment as illustrated in FIG. 7, it is determined by the system how many processors are needed to handle the processing load(s). When it is determined that only two processors are needed, ASMP mode is selected and the two processors (B and one of A/C/D) are controlled to operate in the ASMP mode. When it is determined that three, four or more processors are needed, SMP mode is selected and the three processors (A, B and C) or four processors (A, B, C and D) operate in SMP mode.

The architecture of the system 100 significantly reduces both costs and hardware/software complexity associated with SMP/ASMP dynamic switching as compared to a system with full SMP/ASMP capabilities for each core. For example, in an MP system with four processors/cores, the added cost to a system configured in accordance with the system 100 in which only one processor is dynamically configurable) is on the order of one-third of the added cost compared to a system in which all four processors are dynamically SMP/ASMP configurable.

Testing and investigation has revealed that in most cases, processing requirements can be met with two processors, and in most cases the two processors will be running with unbalanced loads. Thus, the system 100 operating with the two processor cores A and B can be operated only using the ASMP mode to optimize power efficiency. Similarly, for maximum performance, all four processor cores A, B, C and D can be operational in the SMP mode with maximum clock frequency and supply voltage—resulting in flexibility and power reduction while at the same time maintaining the same high end performance when needed. Also, when there are more than 2 processors operating, these can be operated in SMP mode. The system 100 offers beneficial trade-offs between low-cost, low-power and high performance for mobile high level operating systems (HLOS) such as Android/iOS/Windows, and is also suitable for a low- to medium-tier market.

One operational example or method with respect to the system 100 illustrated and described in the FIGURES is now described below.

In this operational scheme, when (1) one or (2) three or more cores are active, the SMP mode is selected and all active processors operate at the same clock frequency and voltage supply. When two cores are active, one of the active processors is Core B and the other active processor is either Core A, Core C or Core D, and the two active processors are configured to operate in ASMP mode.

In multiple processors/cores systems, not all processors/cores are needed at all times. When processing requirements are low only one or a few processors may be needed, and when high more processors may be needed. This concept can be introduced or integrated into the mode selection process, or the mode selection process can be based, at least in part, on how many processors are required to handle computing requirements.

In the systems described herein, additional functionality (not specifically shown) can be provided that enables each core to be clock-disabled and/or power-collapsed to place the processor/core in a sleep mode, disabled or shutdown. This results in a reduction in power consumption by turning off processors that are not needed (when a smaller number of processors can handle the processing requirements).

Various processes or methods can be implemented to determine how many processors are needed to meet current computing requirements. Once this determination is made, then the cores can be switched on/off in any suitable sequence and/or priority, such as described in the paragraphs below.

Figure 8:
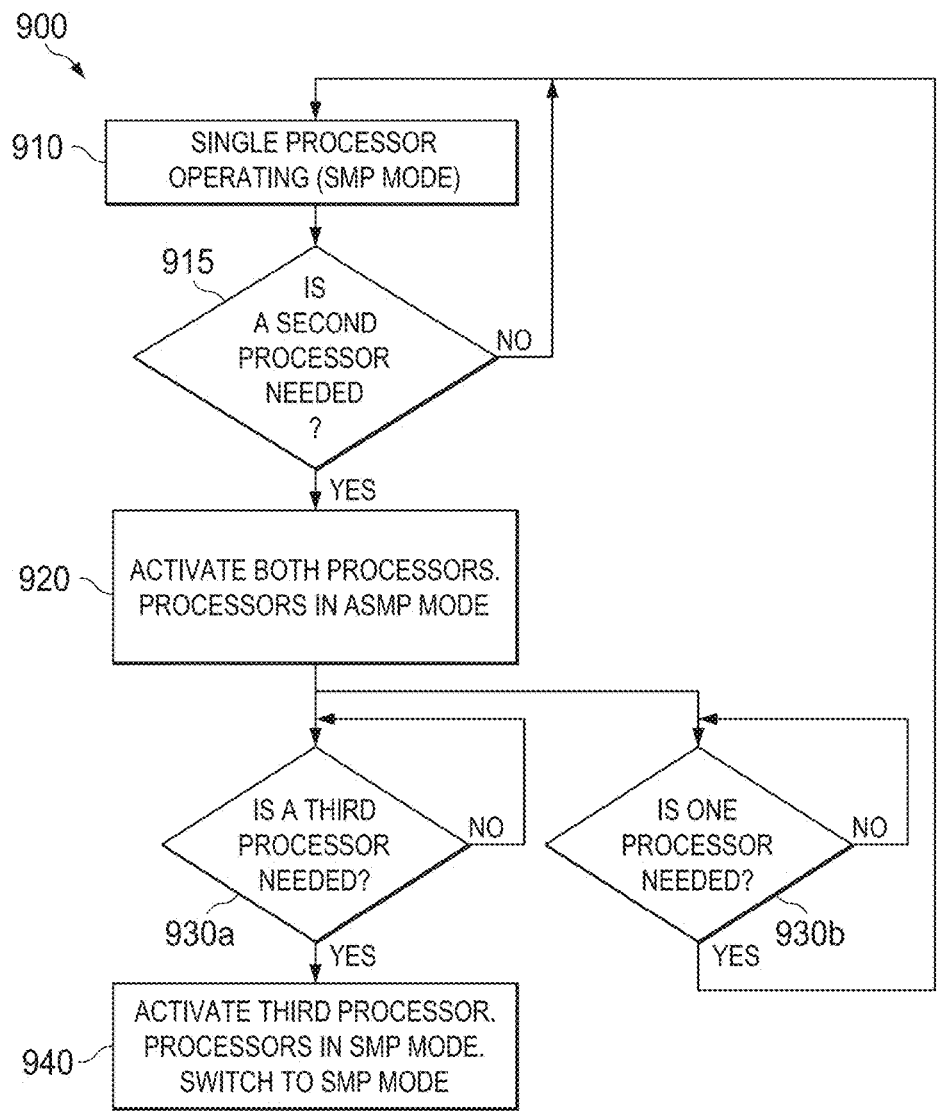
FIG. 8 is a general flow diagram of a process for adding/removing processors integrated with a SMP/ASMP mode selection/switching process.

Now turning to FIG. 8, there is illustrated a general flow diagram of a process 900 for adding/removing processors that is integrated with a SMP/ASMP mode selection(s) process(es). Various rearrangements or modifications may be made to the illustrated process depending on the specific architecture utilized (e.g., number of cores) and the desired functionality or application. As will be appreciated, not all steps or elements that may be utilized in such a process are shown.

The process 900 is shown at a point in which a single processor is operating. When only a single processor is needed, the system 100 operates in the SMP mode at a single fixed CLK1/VDD1 (step 910). At some point during processing operations, it is determined whether a second processor is needed to handle an increase in processing requirements (or for some other reason) (step 915). This determination can be made on a periodic basis or in response to operating information.

In response to the determination that another processor is needed, the process 900 proceeds to activate the second processor, and the two active processors will include at least processor 110b. The two active processors operate in the ASMP mode (920) whereby the second processor (110b) is automatically configured to receive and operate in accordance with CLK2/VDD2 different from CLK1/VDD1 (while the first processor operates with CLK1/VDD1).

Once both processors are active and operate in the ASMP mode. Meanwhile, the system continues to assess the need for more or less computing processing power, etc., and may make a determination whether the processing requirements are at a level such that fewer or more processors are needed (step 930a, 930b). If fewer, the process proceeds back to utilization of a single processor (in SMP mode) (step 910). If more, the process proceeds and activates the third processor (step 940). Since the two processors currently active are in ASMP mode, then they are switched to SMP mode and all three operate in SMP mode.

As will be appreciated, in one embodiment, the system, processes, methods and devices described herein may be utilized in a mobile environment, including incorporated within a mobile device/small computing device or a base station, and the like. Such devices may be, for example, configured to transmit and/or receive wireless signals. The devices may be any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, wearable electronic device or consumer electronics device.

The devices will include at least one processing system 100 (as described herein) which implements various processing operations of the device. This may include, for example, signal coding, data processing, video/audio processing, power control, input/output processing, or any other functionality contemplated for a device.

The processing system 100 also supports the methods and teachings described herein, and may include additional components and processor(s) (e.g., microcontroller, digital signal processor, field programmable gate array, or application specific integrated circuit).

The devices incorporating the processing system 100 may also include at least one transceiver configured to modulate data or other content for transmission by at least one antenna. The transceiver is also configured to demodulate data or other content received by the at least one antenna. Each transceiver includes any suitable structure for generating signals for wireless transmission and/or processing signals received wirelessly. Each antenna includes any suitable structure for transmitting and/or receiving wireless signals. One or multiple transceivers could be used in the device, and one or multiple antennas could be used.

These devices may also include one or more input/output devices to facilitate interaction with a user. Each input/output device includes any suitable structure for providing information to or receiving information from a user, such as a speaker, microphone, keypad, keyboard, display, or touch screen.

In addition, these devices may utilize memory described above, or may include other memory, for storing instructions and data used, generated, or collected by the device. For example, the memory could store software or firmware instructions executed by the processing system 200. The other memory may include any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

Additional details regarding the mobile/small computing devices are known to those of skill in the art. As such, these details are omitted here for clarity.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of non-volatile medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure.

Other changes, substitutions, and alterations are also possible without departing from the spirit and scope of this disclosure, as defined by the following claims.

What is claimed is:

1. A multi-processor (MP) processing system having a first mode of operation and a second mode of operation, comprising:
   a first processor receiving a first clock signal and a first supply voltage, thereby being configured to receive and operate exclusively in accordance with the first supply voltage;
   a voltage regulator circuit configured to receive the first supply voltage, generate a second supply voltage having a different voltage value from the first supply voltage, and selectively provide, based on a bypass signal, an output supply voltage of either the first supply voltage or the second supply voltage;
   a controller coupled to the voltage regulator circuit, the controller configured to generate the bypass signal to the voltage regulator circuit; and
   a second processor connected to the output supply voltage of the voltage regulator circuit, thereby being configured to receive and operate in accordance with the first supply voltage or the second supply voltage;
   wherein, the first processor is further configured to receive and operate in accordance with the first clock signal and the first supply voltage during both the first mode and the second mode of operation.

2. The MP processing system in accordance with claim 1 further comprising:
   a third processor configured to only receive and operate in accordance with the first clock signal and the first supply voltage during both the first mode and second mode of operation.

3. The MP processing system in accordance with claim 2 wherein:
   when in the first mode of operation, the first processor and the third processor receive and operate in accordance with the first clock signal and the first supply voltage; and
   when in the second mode of operation, the second processor receives and operates in accordance with a second clock signal and the second supply voltage, the second clock signal having a different frequency from the first clock signal.

4. The MP processing system in accordance with claim 1, further comprising:
   a clock generation circuit coupled to the controller and configured to generate and output the first clock signal and a second clock signal with a different frequency than the first clock signal, the first clock signal input to the first processor; and
   a switching circuit disposed between the clock generation circuit and the second processor and configured to receive the first clock signal and the second clock signal and output the first clock signal or the second clock signal to the second processor, wherein during a first mode of operation the first clock signal is output to the second processor and during a second mode of operation the second clock signal is output to the second processor;
   wherein during the first and second modes of operation, the first clock signal is output to the first processor.

5. The MP processing system in accordance with claim 1, further comprising:
   cache memory coupled to the first and second processors; and
   a clock-domain crossing (CDC) and bypass circuit responsive to the controller and coupled to the second processor and the cache memory, and further configured to provide a clock-domain crossing function between the second processor and the cache memory during a second mode of operation and provide a bypassing function during a first mode of operation.

6. The MP processing system in accordance with claim 1 wherein the controller is further configured to dynamically switch operation of the second processor between the first mode of operation and the second mode of operation in response to a mode selection signal.

7. The MP processing system in accordance with claim 6 wherein:
   the first processor and the second processor are processors of a plurality of processors; and
   the mode selection signal is generated at least in part based on an activation or deactivation of a processor of the plurality of processors.

8. The MP processing system in accordance with claim 6, wherein the mode selection signal is generated in response to at least a one of the following:
   load information, use information, cache miss rate, memory bandwidth information or power consumption information.

9. The MP processing system in accordance with claim 6, wherein the controller is further configured to pre-set at least one operational characteristic of the voltage regulator in response to the mode selection signal.

10. The MP processing system in accordance with claim 9, wherein the at least one operational characteristic is bias current and the voltage regulator comprises:
    a bias current circuit coupled to the controller and configured to generate and control a bias current of the voltage regulator.

11. The MP processing system in accordance with claim 6, wherein the voltage regulator comprises:
    a current sensor coupled to the output supply voltage of the voltage regulator and configured to generate a current sense feedback signal indicative of a change in output current of the output supply voltage for input to the controller; and
    a control circuit coupled to the controller and configured to control the voltage regulator in response to the current sense feedback signal.

12. The MP processing system in accordance with claim 1 wherein the controller comprises at least one of a finite state machine (FSM), a processor, a microcontroller or logic circuitry.

13. The MP processing system in accordance with claim 1 wherein the MP processing system is disposed on a single substrate.

14. A multi-processor (MP) processing system, comprising:
    a plurality of processors comprising at least a first processor and a second processor, the first processor connected to a first supply voltage having a first predetermined voltage, thereby being configured to receive and operate exclusively in accordance with the first supply voltage;

a voltage regulator circuit configured to receive the first supply voltage, generate a second supply voltage having a second predetermined voltage different from the first predetermined voltage, and selectively provide an output supply voltage of either the first supply voltage or the second supply voltage, the second processor connected to the output supply voltage; and a controller coupled to at least the second processor and configured to:

activate or deactivate the second processor in response to an activation/deactivation signal;

control, upon activation of the second processor, processing within the MP system using the first processor and the second processor in accordance with either a symmetric multiprocessing (SMP) mode or an asymmetric multiprocessing (ASMP) mode, wherein:

the SMP mode is defined where the first processor and the second processor each operate in accordance with a first clock signal having a first predetermined frequency and the first supply voltage, and the ASMP mode is defined where the first processor operates in accordance with the first clock signal and the first supply voltage and the second processor operates in accordance with a second clock signal having a second predetermined frequency different from the first predetermined frequency and in accordance with the second supply voltage;

receive a mode selection signal; and switch operation of the first processor and the second processor from either the SMP mode to the ASMP mode or the ASMP mode to the SMP mode depending on the mode selection signal.

15. The MP system of claim 14, wherein the plurality of processors further comprises:

a third processor configured to only receive and operate in accordance with the first clock signal and the first supply voltage during both the AMP mode and ASMP mode.

16. The MP system of claim 15, wherein:

when in the SMP mode, the first processor and the third processor receive and operate in accordance with the first clock signal and the first supply voltage; and when in the ASMP mode, the second processor receives and operates in accordance with the second clock signal and the second supply voltage.

17. The MP system of claim 14, further comprising:

a clock generation circuit coupled to the controller and configured to generate and output the first clock signal and the second clock signal, the first clock signal input to the first processor; and a switching circuit disposed between the clock generation circuit and the second processor and configured to receive the first clock signal and the second clock signal and output the first clock signal or the second clock signal to the second processor, wherein during the SMP mode the first clock signal is output to the second processor and during the ASMP mode the second clock signal is output to the second processor;

wherein during the SMP mode and the ASMP mode, the first clock signal is output to the first processor.

18. The MP system of claim 14, further comprising:

cache memory coupled to the first and second processors; and a clock-domain crossing (CDC) and bypass circuit responsive to the controller and coupled to the second processor and the cache memory, and further configured to provide a clock-domain crossing function between the second processor and the cache memory during a second mode of operation and provide a bypassing function during a first mode of operation.

19. The MP system of claim 14 wherein the controller is further configured to dynamically switch operation of the second processor between the SMP mode and the ASMP mode in response to a mode selection signal.

20. The MP system of claim 19, wherein:

the mode selection signal is generated at least in part based on an activation or deactivation of a processor of the plurality of processors.

21. The MP system of claim 19, wherein the mode selection signal is generated in response to at least a one of the following:

load information, use information, cache miss rate, memory bandwidth information or power consumption information.

22. The MP system of claim 19, wherein the controller is further configured to pre-set at least one operational characteristic of the voltage regulator in response to the mode selection signal.

23. The MP system of claim 22, wherein the at least one operational characteristic is bias current and the voltage regulator comprises:

a bias current circuit coupled to the controller and configured to generate and control a bias current of the voltage regulator.

24. The MP system of claim 19, wherein the voltage regulator comprises:

a current sensor coupled to the output supply voltage of the voltage regulator and configured to generate a current sense feedback signal indicative of a change in output current of the output supply voltage for input to the controller; and a control circuit coupled to the controller and configured to control the voltage regulator in response to the current sense feedback signal.

25. The MP system of claim 14 wherein the controller comprises at least one of a finite state machine (FSM), a processor, a microcontroller or logic circuitry.

26. The MP system of claim 14 wherein the MP system is disposed on a single substrate.

\* \* \* \* \*